(12) United States Patent
Adobati et al.

(10) Patent No.: US 10,077,919 B2
(45) Date of Patent: Sep. 18, 2018

(54) STORAGE BOILER

(71) Applicant: N&W GLOBAL VENDING S.P.A., Valbrembo (IT)

(72) Inventors: Matteo Adobati, Nembro (IT); Alessandro Magno, Brembate Sopra (IT)

(73) Assignee: N&W GLOBAL VENDING S.P.A., Valbrembo (IT)

( * ) Notice: Subject to any disclaimer, the term of this patent is extended or adjusted under 35 U.S.C. 154(b) by 44 days.

(21) Appl. No.: 14/420,323

(22) PCT Filed: Aug. 13, 2013

(86) PCT No.: PCT/IB2013/056621
§ 371 (c)(1),
(2) Date: Feb. 6, 2015

(87) PCT Pub. No.: WO2014/027310
PCT Pub. Date: Feb. 20, 2014

(65) Prior Publication Data
US 2015/0226452 A1 Aug. 13, 2015

(30) Foreign Application Priority Data
Aug. 13, 2012 (IT) .............................. TO2012A0726

(51) Int. Cl.
*F24H 1/20* (2006.01)
*A47J 31/54* (2006.01)
(Continued)

(52) U.S. Cl.
CPC .............. *F24H 1/202* (2013.01); *A47J 31/54* (2013.01); *A47J 31/56* (2013.01); *F24H 1/22* (2013.01); *F24H 1/225* (2013.01); *F24H 9/0021* (2013.01)

(58) Field of Classification Search
None
See application file for complete search history.

(56) References Cited

U.S. PATENT DOCUMENTS 3,666,918 A * 5/1972 Clark, Jr. .............. F24H 9/0021
122/19.1
3,766,974 A * 10/1973 Kirschner ................. F24H 1/20
122/15.1
(Continued)

FOREIGN PATENT DOCUMENTS

CH 367610 4/1963
CN 101113837 1/2008
(Continued)

OTHER PUBLICATIONS

International Search Report and Written Opinion from International Application No. PCT/IB2013/056621 dated Jan. 3, 2014.
(Continued)

*Primary Examiner* — Thor Campbell
(74) *Attorney, Agent, or Firm* — Dorsey & Whitney LLP

(57) ABSTRACT

A storage boiler, a tank of which has a first chamber for housing a given quantity of water; an inlet for feeding water into the first chamber; an outlet for discharging water from the tank; and a first resistor fitted inside the first chamber to heat the water inside the first chamber to, and keep it at, a standby first temperature; the first chamber housing a tubular body, which houses a second chamber communicating with the first chamber and with the outlet, and housing a second resistor selectively activatable to heat the water flowing through the second chamber to a dispensing second temperature higher than the first temperature.

11 Claims, 2 Drawing Sheets

(51) Int. Cl.
 *F24H 1/22* (2006.01)
 *F24H 9/00* (2006.01)
 *A47J 31/56* (2006.01)

(56) References Cited

U.S. PATENT DOCUMENTS

| | | | | |
|---|---|---|---|---|
| 6,175,689 | B1* | 1/2001 | Blanco, Jr. | F24H 1/102 |
| | | | | 392/474 |
| 6,240,250 | B1* | 5/2001 | Blanco, Jr. | F24H 1/102 |
| | | | | 392/474 |
| 6,280,688 | B1* | 8/2001 | Motz | B08B 3/10 |
| | | | | 134/169 C |
| 6,574,426 | B1* | 6/2003 | Blanco, Jr. | F24H 1/102 |
| | | | | 392/485 |
| 6,659,048 | B1* | 12/2003 | DeSantis | F24H 1/18 |
| | | | | 122/13.3 |
| 7,773,868 | B2* | 8/2010 | Moore | F24D 17/0078 |
| | | | | 122/14.3 |
| 8,807,093 | B2* | 8/2014 | Steinhafel | F24H 1/00 |
| | | | | 122/135.3 |
| 9,103,562 | B2* | 8/2015 | Nakagawa | F24H 1/122 |
| 9,234,678 | B1* | 1/2016 | Boros | F24H 1/181 |
| 2002/0117122 | A1* | 8/2002 | Lindner | F24D 17/00 |
| | | | | 122/13.3 |
| 2002/0146241 | A1* | 10/2002 | Murahashi | F24H 1/18 |
| | | | | 392/308 |
| 2003/0226523 | A1* | 12/2003 | DeSantis | F24H 1/18 |
| | | | | 122/20 R |
| 2004/0079749 | A1 | 4/2004 | Young et al. | |
| 2008/0152331 | A1* | 6/2008 | Ryks | F24H 1/08 |
| | | | | 392/490 |
| 2008/0197205 | A1* | 8/2008 | Ene | F24H 1/43 |
| | | | | 237/19 |
| 2010/0092164 | A1* | 4/2010 | Ziehm | F24H 1/142 |
| | | | | 392/485 |

FOREIGN PATENT DOCUMENTS

| | | |
|---|---|---|
| CN | 101836824 | 9/2010 |
| CN | 201879489 | 6/2011 |
| DE | 3218442 | 11/1983 |
| EP | 0001453 | 4/1979 |
| EP | 0143619 | 6/1985 |
| EP | 0422738 | 4/1991 |

OTHER PUBLICATIONS

Second Written Opinion of the International Preliminary Examining Authority from International Application No. PCT/IB2013/056621 dated Aug. 26, 2014.

International Preliminary Report on Patentability from International Application No. PCT/IB2013/056621 dated Nov. 12, 2014.

* cited by examiner

STORAGE BOILER

TECHNICAL FIELD

The present invention relates to a storage boiler, i.e. a boiler designed to heat a given quantity of liquid to, and keep it at, a given temperature.

More specifically, the present invention relates to a storage boiler for use in hot-beverage vending machines, e.g. vending machines for producing coffee beverages such as espresso coffee (ES), instant coffee (INST) and/or weak coffee (FB), and of the type comprising a tank with a chamber for housing a given quantity of water; an inlet for feeding water into the chamber; an outlet for discharging water from the tank; and heating means fitted inside the chamber to heat the water inside the chamber to, and keep it at, a standby temperature.

BACKGROUND ART

Ordinary storage boilers, such as those for domestic use, may be 'single', i.e. comprise one tank and one heater, or 'double', i.e. comprise two storage boilers in series and one inside the other, such as those described in DE3218442 or US2004/0079749. In the latter case, the storage boiler comprises a main tank with a first heater for heating the water to, and keeping it at, a given standby temperature T1; and a smaller secondary tank inserted inside and insulated thermally from the main tank, and having a second heater for heating the water to, and keeping it at, a given second standby temperature T2 higher than T1. Another example of a 'double' storage boiler is described in CH367610, in which the second heater is only activated to produce steam; in which case, in response to the increase in pressure inside the secondary tank, a valve cuts off the fluid connection between the two tanks, so that only the water in the secondary tank is converted to steam.

In known storage boilers used in hot-beverage vending machines, the heating means usually comprise one or more electric resistors for heating the water in the tank to, and keeping it at, a standby temperature equal to the temperature at which the beverage is dispensed, and which is normally close to 100° C., but varies from one beverage to another.

Known storage boilers of the above type have numerous drawbacks, foremost of which are:

- a relatively high standby temperature, which, both in itself and because of the pressures generated, rules out plastic as a manufacturing material for the tank, which is normally made of metal, preferably steel;
- poor thermal efficiency, due to severe heat loss to the outside caused by the relatively high standby temperature and the metal from which the tank is made;
- poor versatility, due to the impossibility, even by modulating the electric resistors, of altering the temperature of all the water in the tank relatively quickly; as a result, a vending machine for producing different hot beverages at different temperatures must normally be equipped with a number of boilers, preferably one for each type of beverage.

DISCLOSURE OF INVENTION

It is an object of the present invention to provide a storage boiler of the type described above, designed to eliminate the above drawbacks.

According to the present invention, there is provided a storage boiler as claimed in Claim 1 and preferably in any one of the Claims depending directly or indirectly on Claim 1.

BRIEF DESCRIPTION OF THE DRAWINGS

A non-limiting embodiment of the invention will be described by way of example with reference to the attached drawings, in which.

BEST MODE FOR CARRYING OUT THE INVENTION

Figure 1:
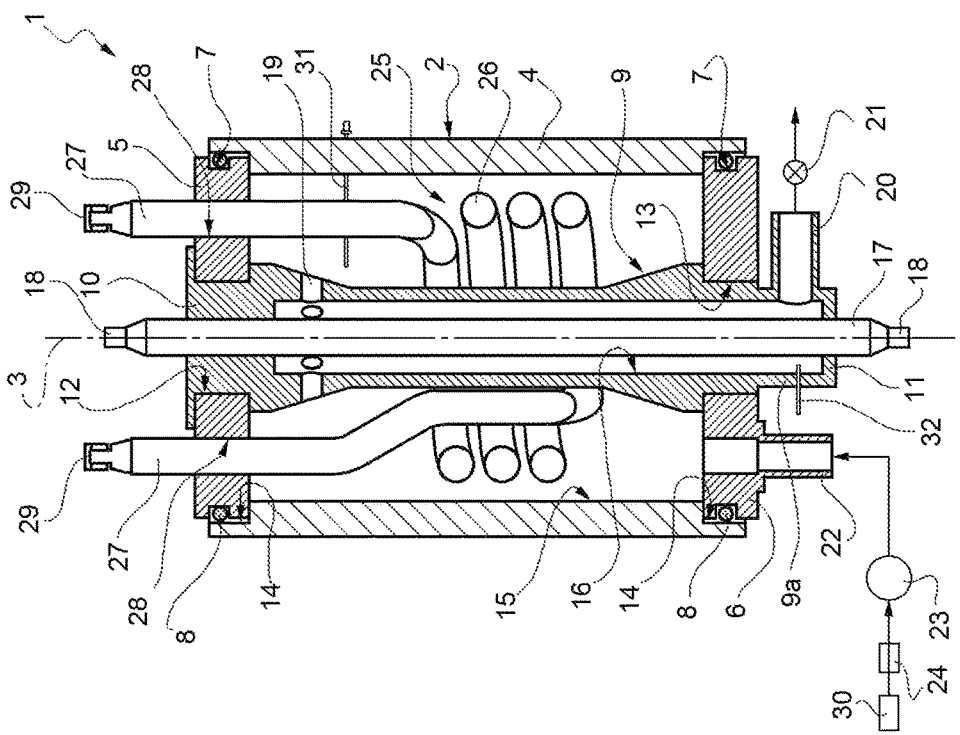
FIG. 1 shows a partly sectioned, schematic side view, with parts removed for clarity, of a preferred embodiment of the storage boiler according to the present invention.
Figure 2:
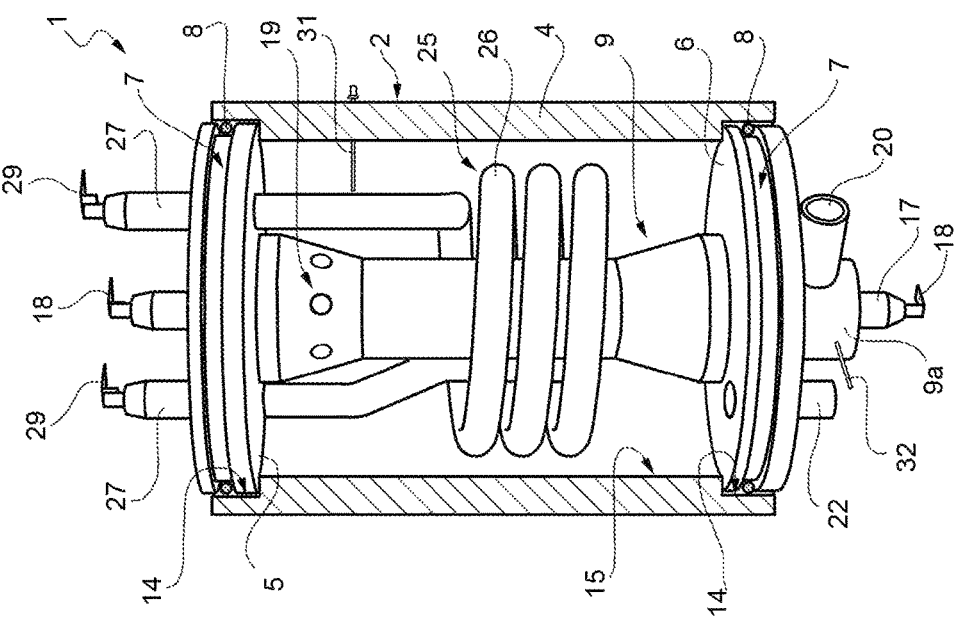
FIG. 2 shows an axial section of the storage boiler in FIG. 1.

Number 1 in FIGS. 1 and 2 indicates as a whole a boiler, in particular a storage boiler, comprising a tank 2, which, in the example shown (but not necessarily), is substantially cylindrical with a vertical longitudinal axis 3.

Tank 2 comprises a cylindrical lateral wall 4 coaxial with longitudinal axis 3 and preferably made of plastic; a top wall 5 and a bottom wall 6, each preferably made of plastic and defined by a circular plate having a peripheral annular groove 7 housing a seal 8; and a central tubular tie 9, which is generally made of metal, is coaxial with longitudinal axis 3, and connects top and bottom walls 5 and 6 to each other and to lateral wall 4.

More specifically, tie 9 is closed at opposite ends by two walls 10 and 11 crosswise to longitudinal axis 3, has two end portions which engage respective through holes 12 and 13 formed in top wall 5 and bottom wall 6 respectively, and holds each of top and bottom walls 5 and 6 in position with its outer periphery and seal 8 engaged inside a respective inner annular groove 14 on the respective end of lateral wall 4, and with its outer periphery resting on a respective annular shoulder defined by the respective annular groove 14.

Inside tank 2, tie 9 defines two annular chambers 15 and 16 coaxial with longitudinal axis 3, and of which chamber 15 is located outwards of chamber 16, and is bounded axially by top and bottom walls 5 and 6, and laterally by lateral wall 4 and tie 9. Chamber 16 is located inside tie 9, is smaller in volume than chamber 15, is bounded axially by walls 10 and 11, and is bounded internally by a modulatable shielded resistor 17, which is coaxial with longitudinal axis 3, is fitted in fluidtight manner through holes in walls 10 and 11, and has two opposite end portions projecting outwards of tie 9 and tank 2 and fitted with respective terminals 18.

Chamber 16 communicates at one end with chamber 15 through a number of openings 19 formed through the lateral wall of tie 9, close to wall 10, and communicates at the other end with a radial outflow or outlet conduit 20 controlled by a solenoid valve 21 and fitted to an end portion 9a of tie 9 projecting outwards of tank 2, at bottom wall 6. Chamber 15 communicates with the outside along an axial inflow or inlet conduit 22 fitted through bottom wall 6 and connected to the delivery of a pump 23 with the interposition of a non-return valve 24.

Chamber 15 houses a shielded resistor 25, which comprises a coiled central portion 26 coaxial with longitudinal axis 3 and coiled about tie 9; and two end portions 27, each of which extends parallel to longitudinal axis 3, is fitted in fluidtight manner through a respective hole 28 in top wall 5, and terminates, outside tank 2, with a respective terminal 29.

Boiler 1 is equipped with a flow measuring device 30 connected, as are solenoid valve 21, resistors 17 and 25, and pump 23, to a central control unit (not shown). Flow measuring device 30 is located upstream from pump 23, and serves to control water inflow into chamber 15, so that chamber 15 is completely full at all times.

Boiler 1 is also equipped with two temperature measuring devices, also connected to the central control unit (not shown), and of which one measures the water temperature inside chamber 15 at a level close to openings 19, and the other the water temperature inside chamber 16, close to conduit 20. In the example shown, one temperature measuring device is defined by a temperature probe 31 fitted through lateral wall 4 at the height of openings 19, and the other by a temperature probe 32 fitted through end portion 9a of tie 9.

In use and at rest, the central control unit cyclically activates resistor 25 to keep all the water in boiler 1 at a relatively low standby temperature T1, e.g. of 50-60° C., and resistor 17 is kept off.

When a beverage is ordered which involves dispensing a specific quantity Q of water at a specific dispensing temperature T2 at least equal to but normally higher than T1 and normally ranging between 85 and 98° C., the central control unit activates resistor 17 to heat the water inside chamber 16 almost instantaneously to temperature T2, opens solenoid valve 21, and activates pump 23 to feed the quantity Q of water—in this case, water at ambient temperature—into the bottom of chamber 15, and at the same time cause a quantity Q of water to overflow into chamber 16 and out along outlet conduit 20. As it flows along chamber 16 to outlet conduit 20, the quantity Q of water at temperature T1 is heated instantaneously to temperature T2 by resistor 17.

Once the quantity Q of water at temperature T2 is dispensed, pump 23 and resistor 17 are turned off, solenoid valve 21 is closed, and resistor 25 is activated cyclically to heat the water in boiler 1 to, and keep it at, temperature T1.

The advantages of boiler 1 with respect to known storage boilers are obvious:
- the temperature T1 of the water contacting lateral wall 4 and top and bottom walls 5 and 6 is low enough for these walls to be made of plastic, thus greatly reducing the production cost of boiler 1, and eliminating any problems caused by heavy metals in the dispensed water;
- as in the FIGS. 1 and 2 example, boiler 1 may preferably be made in a number of parts (lateral wall 4, top wall 5, and bottom wall 6) connected with the interposition of seals and disconnectable easily to allow full and easy access to boiler 1 for inspection, maintenance and repair;
- heat dispersion to the outside is much lower than that of known storage boilers, by temperature T1 being lower than dispensing temperature T2, by improving thermal insulation by making lateral wall 4 and top and bottom walls 5 and 6 from plastic, and by the water at dispensing temperature T2—only present inside chamber 16 when the water is dispensed—being shielded from the outside by the mass of water, at temperature T1, inside chamber 15;
- the fact that all the water in boiler 1 is maintained at temperature T1, as opposed to dispensing temperature T2, in standby mode, and only the water in chamber 16, which is smaller in volume than chamber 15, is only heated to temperature T2 as it is dispensed, greatly reduces energy consumption;
- feeding water into the bottom of chamber 15 and withdrawing water from the top of chamber 15, through openings 19, enables the temperature layers inside chamber 15 to be exploited to maximum effect as the relatively cold water flows in along conduit 22; inflow of this cold water, in fact, has practically no effect on the temperature of the water at openings 19, which remains substantially at temperature T1;
- by temporarily modulating operation of resistor 17, temperature T2 can be adapted to the selected-beverage temperature using one boiler for a number of types of beverages, as opposed to each beverage type, thus reducing cost and size;
- by software-setting temperature T1 on the basis of location/market, operation of the boiler can be adapted in such a way as to privilege standby consumption (lower temperature T1) or performance (temperature T1 closer to dispensing temperature T2) as required.

In a variation not shown, resistor 25 in chamber 15 may be replaced with two resistors, each of a power roughly half that of resistor 25. Using two low-power, i.e. low-thermal-inertia, heating elements as opposed to one higher-power heating element has the dual advantage of permitting more accurate water temperature control, and preventing 'flicker'—i.e. the disturbance caused by connecting and disconnecting a large, discontinuously-operating load connected to the electricity mains—thus improving performance of the boiler.

Figure 3:
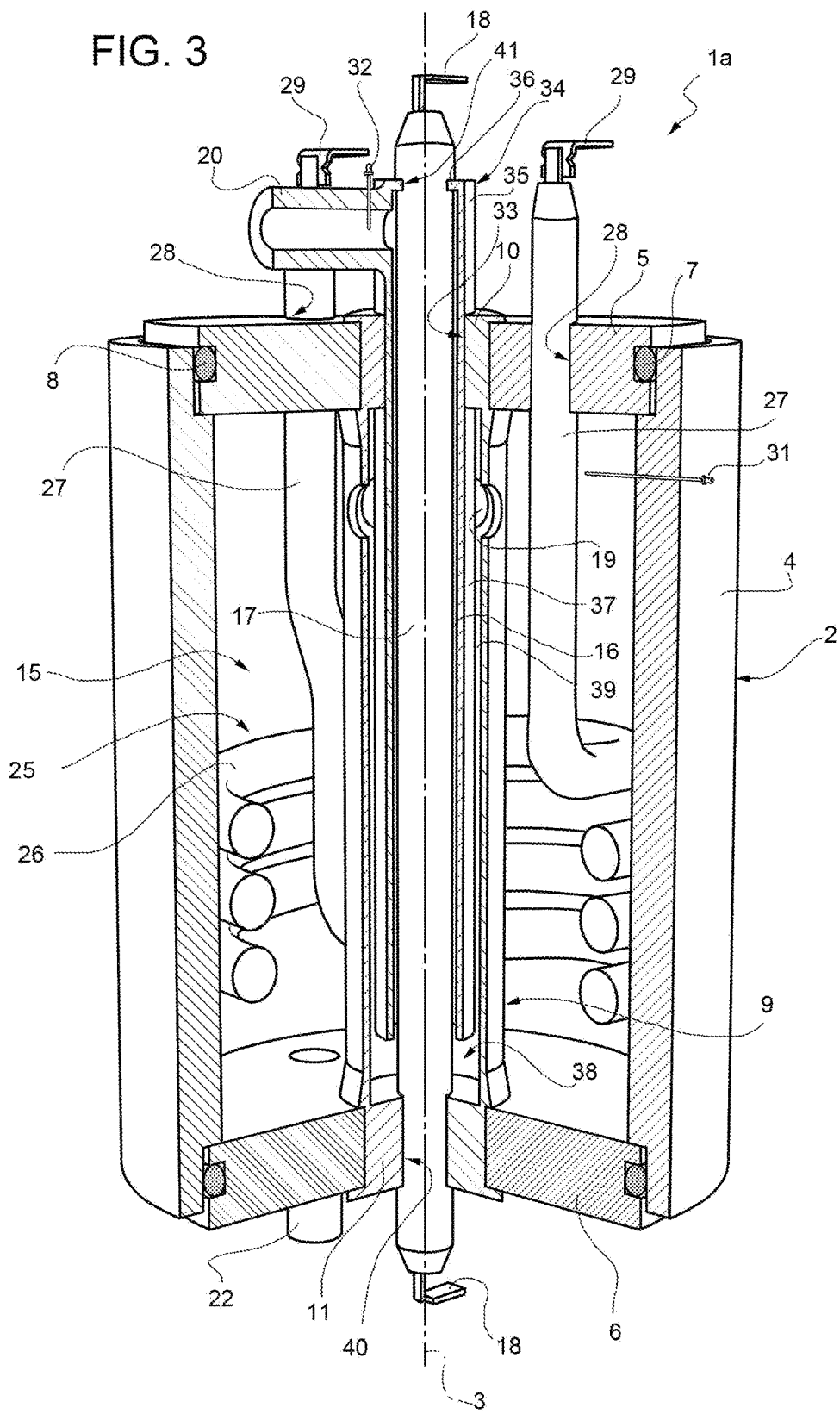
FIG. 3 shows a section of a variation of the FIGS. 1 and 2 storage boiler.

The FIG. 3 variation relates to a boiler 1a designed to feed water into the bottom of chamber 15, discharge water at temperature T2 from the top end of chamber 16, and, if possible, improve thermal efficiency.

Accordingly, tie 9 of boiler 1a has no end portion 9a, and wall 10 has a central hole 33 coaxial with longitudinal axis 3 and engaged in fluidtight manner by a tubular body 34, which extends inside tie 9 and comprises a portion 35, which is closed axially by an end wall 36, projects outwards of top wall 5, and has outlet conduit 20. Tubular body 34 also comprises a portion 37, which extends inside tie 9, coaxially with longitudinal axis 3, and terminates a given distance from wall 11 to define, with wall 11, an annular passage 38.

Inside tie 9, tubular body 34 internally defines chamber 16, and externally defines, together with tie 9, an intermediate chamber 39, which communicates with chamber 15 through openings 19, and with chamber 16 through annular passage 38.

Resistor 17 of boiler 1a is fitted in fluidtight manner through a hole 40 in wall 11, and through a hole 41 formed in end wall 36 and coaxial with longitudinal axis 3 and hole 40.

Operation of boiler 1a differs from that of boiler 1 by chamber 15 communicating with chamber 16 not only through openings 19, but through openings 19 in conjunction with intermediate chamber 39; and by intermediate chamber 39 not only inverting flow along chamber 16 to withdraw hot water from the top, but also thermally shielding chamber 16 more effectively from chamber 15.

The invention claimed is:

1. A water boiler having a single water inlet and a single water outlet, the water boiler comprising:
   a storage water heater including:
      a water tank with a water inlet defining the single water inlet of the water boiler and a water outlet; and a first electric heater arranged in the water tank to heat the water therein to and maintain the water stored therein at a first temperature;

wherein the storage water heater includes:

a continuous-flow water heater arranged in the water tank of the storage water heater, the continuous-flow water heater including:

a water inlet connected to the water outlet of the water tank;

a water outlet defining the single water outlet of the water boiler; and a second electric heater selectively operable to heat water flowing through the continuous-flow water heater to a second temperature that is higher than the first temperature only when the water boiler is required to dispense a beverage;

a chamber extending from an annular passage to the water outlet; the chamber at least partially defined by the second electric heater and a first portion; and an intermediate chamber extending from the annular passage to the water inlet, the intermediate chamber at least partially defined by the first portion and a second portion, the first portion at least partially defining the annular passage and including a first wall that separates the chamber from the intermediate chamber, the second portion at least partially defining the water inlet and including a second wall that separates the intermediate chamber from the water tank;

wherein the first electric heater surrounds the continuous-flow water heater and the second electric heater; and wherein the continuous-flow water heater is configured to flow the water through:

the chamber in a first direction that is coaxial with a longitudinal axis of the water tank; and the intermediate chamber in a second direction that is opposite the first direction and coaxial with the longitudinal axis of the water tank.

2. The water boiler of claim 1, wherein the water inlet and the water outlet of the water boiler are arranged on one and the same side of the water boiler; and wherein the chamber is annular, intended to be flown through by water, and fluidically connected to the water tank at an opposite side of the water tank with respect to the water inlet of the water tank.

3. The water boiler of claim 1, wherein the water inlet and the water outlet of the water boiler are arranged on opposite sides of the water boiler; and wherein the chamber is annular, intended to be flown through by water, and connected to the water tank through openings arranged at an opposite side of the water tank with respect to the water inlet of the water boiler, and through the intermediate chamber external to, and coaxial with, the chamber; and wherein the intermediate chamber fluidically communicates with the chamber at an opposite side of the chamber with respect to the water outlet of the water boiler.

4. The water boiler of claim 2, wherein the continuous-flow water heater includes a substantially cylindrical hollow body housing the second electric heater, which defines, with the substantially cylindrical hollow body, the chamber intended to be flown through by water.

5. The water boiler of claim 3, wherein the water tank has a longitudinal axis; and the substantially cylindrical hollow body and each of the chamber and the intermediate chamber are coaxial with the longitudinal axis.

6. The water boiler of claim 4, wherein the water tank has a substantially vertical longitudinal axis, and includes a lateral wall coaxial with the longitudinal axis; and a top wall and a bottom wall fitted in fluidtight manner to the lateral wall; the substantially cylindrical hollow body being a tubular body coaxial with the longitudinal axis, and being designed to define a tie connecting the lateral wall, the top wall, and the bottom wall.

7. The water boiler of claim 6, wherein the lateral wall, the top wall, and the bottom wall are made of plastic.

8. The water boiler of claim 6, wherein the first electric heater includes a first resistor having a portion housed inside the first chamber and coiled about the substantially cylindrical hollow body.

9. The water boiler of claim 6, wherein the second electric heater includes a second resistor extending along the substantially cylindrical hollow body and through the chamber.

10. The water boiler of claim 6, wherein the lateral wall, the top wall, and the bottom wall are distinct parts with seals disposed between the lateral wall and each of the top wall and the bottom wall.

11. The water boiler of claim 6, wherein the water tank at least partially made from plastic.

* * * * *